(12) United States Patent
Joh et al.

(10) Patent No.: US 9,001,394 B2
(45) Date of Patent: Apr. 7, 2015

(54) IMAGE SCANNING APPARATUS AND CONTROL METHOD THEREOF

(75) Inventors: Seung-je Joh, Seoul (KR); Sun-hee Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 68 days.

(21) Appl. No.: 13/453,633

(22) Filed: Apr. 23, 2012

(65) Prior Publication Data

US 2013/0128322 A1    May 23, 2013

(30) Foreign Application Priority Data

Nov. 18, 2011    (KR) ........................ 10-2011-0120930

(51) Int. Cl.
*H04N 1/04*    (2006.01)
*H04N 1/028*   (2006.01)
*H04N 1/40*    (2006.01)

(52) U.S. Cl.
CPC ......... *H04N 1/02835* (2013.01); *H04N 1/4005* (2013.01); *H04N 1/40056* (2013.01)

(58) Field of Classification Search
USPC ............... 358/475, 474, 484, 487, 497, 498
See application file for complete search history.

(56) References Cited

U.S. PATENT DOCUMENTS

| | | | |
|---|---|---|---|
| 4,956,547 A * | 9/1990 | Mita ......................... | 250/208.1 |
| 5,063,462 A | 11/1991 | Nakagawa et al. | |
| 5,457,623 A * | 10/1995 | Manor ........................... | 363/98 |
| 8,059,315 B2 * | 11/2011 | Endo et al. .................... | 358/474 |
| 2001/0035986 A1 | 11/2001 | Ikeda | |
| 2002/0057469 A1 | 5/2002 | Yushiya et al. | |
| 2009/0310192 A1 * | 12/2009 | Endo et al. .................... | 358/474 |
| 2011/0102862 A1 * | 5/2011 | Inoue et al. ................... | 358/474 |

FOREIGN PATENT DOCUMENTS

EP    0 785 671 A2    7/1997

OTHER PUBLICATIONS

Extended European Search report issued May 29, 2013 in corresponding European Patent Application No. 12186118.1.

* cited by examiner

*Primary Examiner* — Houshang Safaipour
(74) *Attorney, Agent, or Firm* — Staas & Halsey LLP

(57) ABSTRACT

An image scanning apparatus and method are provided. The image scanning apparatus scans an image of a document and converts the scanned image into digital data, and includes light sources that emit light. The apparatus includes a light guide unit that diffuses the light emitted by the light sources and a sensor unit that senses image data from the document by recognizing light reflected from the document by being diffused by the light guide unit. The apparatus includes a control unit that controls the turning on of the light sources. The control unit alternately turns on or off the light sources such that at least one of the light sources is turned on when at least one other light source is turned off.

19 Claims, 7 Drawing Sheets

IMAGE SCANNING APPARATUS AND CONTROL METHOD THEREOF

CROSS-REFERENCE TO RELATED APPLICATIONS

This application is related to and claims priority to Korean Patent Application No. 10-2011-0120930, filed on Nov. 18, 2011, in the Korean Intellectual Property Office, the disclosure of which is incorporated herein.

BACKGROUND

1. Field

The embodiments discussed herein relate to an image scanning apparatus and a control method thereof.

2. Description of the Related Art

An image scanning apparatus is an apparatus that scans an original image such as a document, a picture or a film, and converts the scanned image into digital data. The digital data may be shown on a computer monitor or printed out by a printer and be generated as an output image. Such an image scanning apparatus may be a scanner, copier, facsimile, or an MFP (Multi Function Peripheral) where the functions of a scanner, copier and facsimile are integrated in one apparatus.

An image scanning apparatus uses a light source for emitting light for performing scanning. For example, cold cathode fluorescent lamps (CCFLs), xenon (Xe) lamps, or light-emitting diodes (LEDs) may be used as the light source.

Due to the risks posed to the environment by CCFLs or Xe lamps and the shortcomings of CCFLs or Xe lamps such as low efficiency and high power consumption, LEDs are becoming more widely employed as light sources for image scanning apparatuses.

The temperature of LEDs gradually increases as the LEDs emit light. Since the performance and lifetime of LEDs depend on the temperature of the LEDs, a heat dissipation plate may be provided in an image scanning apparatus using LEDs as light sources. The size of the heat dissipation plate may be determined by the amount of heat to dissipate from the LEDs. Accordingly, in the case of using high-performance LEDs, a large-size heat dissipation plate may be needed to adequately dissipate heat. However, the use of a large-size heat dissipation plate may lead to an increase in the manufacturing cost of an image scanning apparatus, and it is difficult to secure enough space for accommodating a large-size heat dissipation plate in an image scanning apparatus.

To address these problems, an array of a plurality of low-performance LEDs may be used as a light source for an image scanning apparatus. However, the low-performance LEDs may not be able to uniformly emit light, and also may contribute to an increase in the manufacturing cost of an image scanning apparatus.

SUMMARY

Additional aspects and/or advantages will be set forth in part in the description which follows and, in part, will be apparent from the description, or may be learned by practice of the invention.

An exemplary embodiment may address at least the above problems and/or disadvantages and other disadvantages not described above.

An exemplary embodiment provides an image scanning apparatus and a control method thereof.

According to an aspect of the exemplary embodiment, an image scanning apparatus is provided that scans an image of a document and converts the scanned image into digital data, the image scanning apparatus including, a plurality of light sources that emit light, a light guide unit that diffuses the light emitted by the light sources, a sensor unit that senses image data from the document by recognizing light reflected from the document by being diffused by the light guide unit, and a control unit that controls the turning on of the light sources, wherein the control unit alternately turns on or off the light sources such that at least one of the light sources is turned on when at least one other light source is turned off.

The control unit may control a turn-on duty of each of the light sources to be at least 50% or higher.

The control unit may control a frequency of each of the light sources to be within a range of about 50 kHz to about 200 kHz.

The light guide unit may include a first light guide and a second light guide.

The light sources may include at least one light source installed at one end of the first light guide and at least one light source installed at one end of the second light guide.

The light sources may include a first light source and a second light source.

The first light source may be installed at one end of the first light guide and the second light source may be installed at one end of the second light guide.

The control unit may control the first light source and the second light source to be alternately turned on.

The control unit may control the first light source and the second light source such that a turn-on period of the first light source and a turn-on period of the second light source partially overlap with each other.

The light sources may be light-emitting diodes (LEDs).

According to another aspect of the an exemplary embodiment, there is provided a control method of an image scanning apparatus which scans an image of a document and converts the scanned image into digital data, the control method including: emitting light by turning on a plurality of light sources; sensing image data from the document by recognizing light reflected from the document by being diffused; and converting the image data into digital data, wherein the turning on the light sources comprises alternately turning on or off the light sources such that at least one of the light sources is turned on when at least one other light source is turned off.

The turning on the light sources may also include controlling a turn-on duty of each of the light sources to be at least 50% or higher.

The turning on the light sources may also include controlling a frequency of each of the light sources to be within a range of about 50 kHz to about 200 kHz.

The turning on the light sources further may include controlling the light sources such that turn-on periods of the light sources do not overlap with each another.

The turning on the light sources may also include controlling the light sources such that turn-on periods of the light sources partially overlap with each another.

The light sources may be LEDs.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
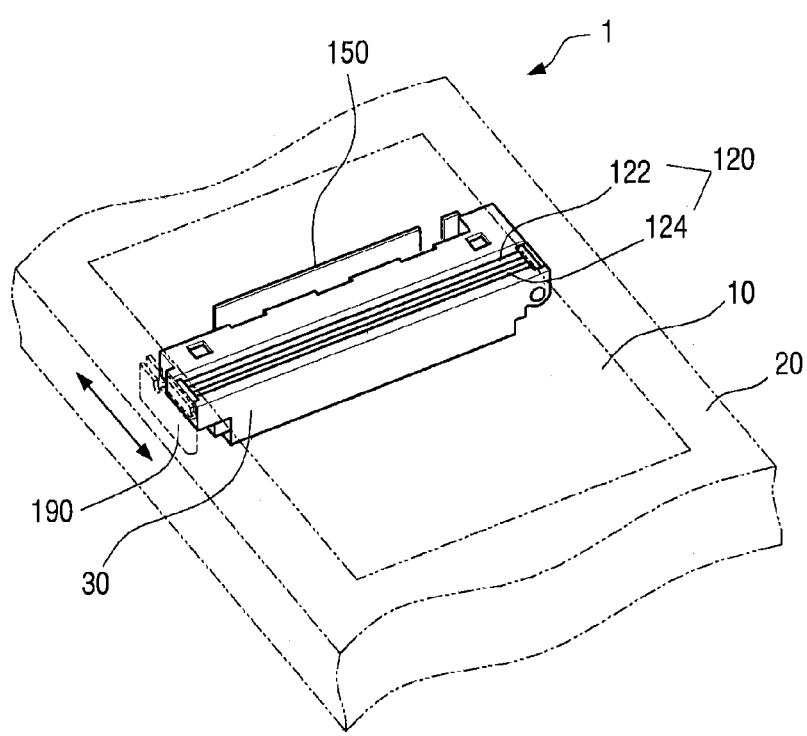
FIG. 1 illustrates an image scanning apparatus according to an exemplary embodiment.

Exemplary embodiments are described in greater detail with reference to the accompanying drawings.

In the following description, the same drawing reference numerals are used for similar elements even in different drawings. The matters defined in the description, such as detailed construction and elements, are provided to assist in a comprehensive understanding of the exemplary embodiments. However, an exemplary embodiment can be carried out without those specifically defined matters.

Figure 2:
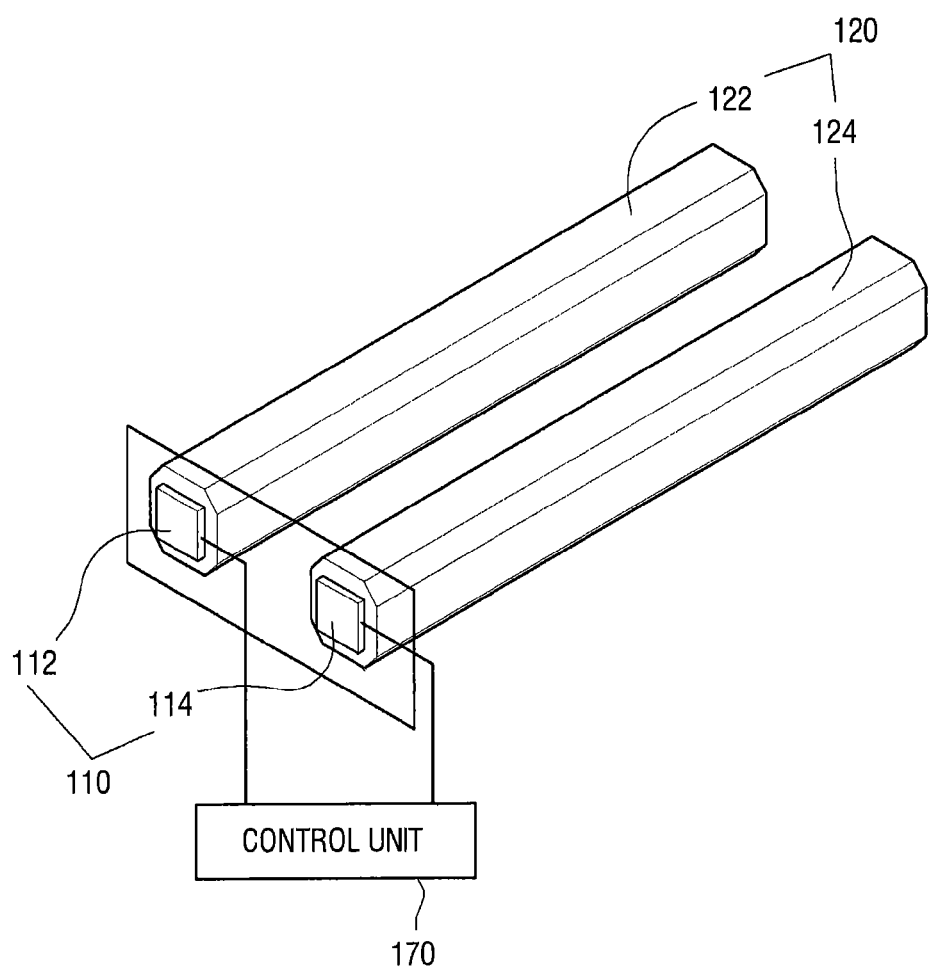
FIG. 2 illustrates an example of the structure of the image scanning apparatus illustrated in FIG. 1, according to an exemplary embodiment.
Figure 3:
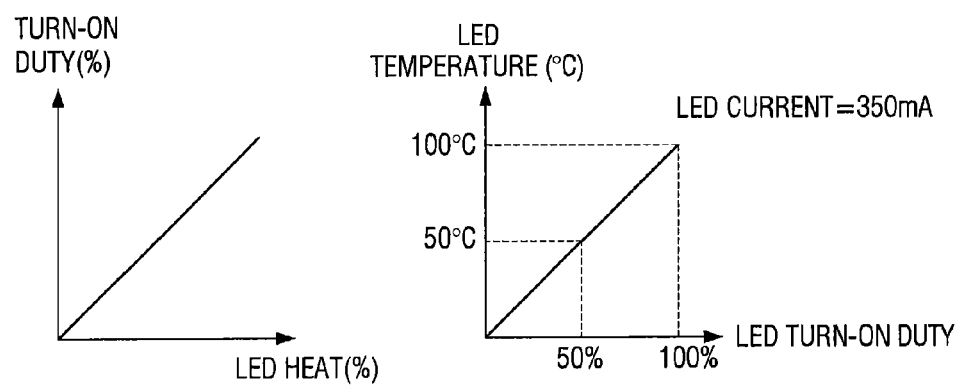
FIG. 3 illustrates an example of the relationship between the turn-on duty of a light-emitting diode (LED) and the temperature of heat generated by the LED.
Figure 4:
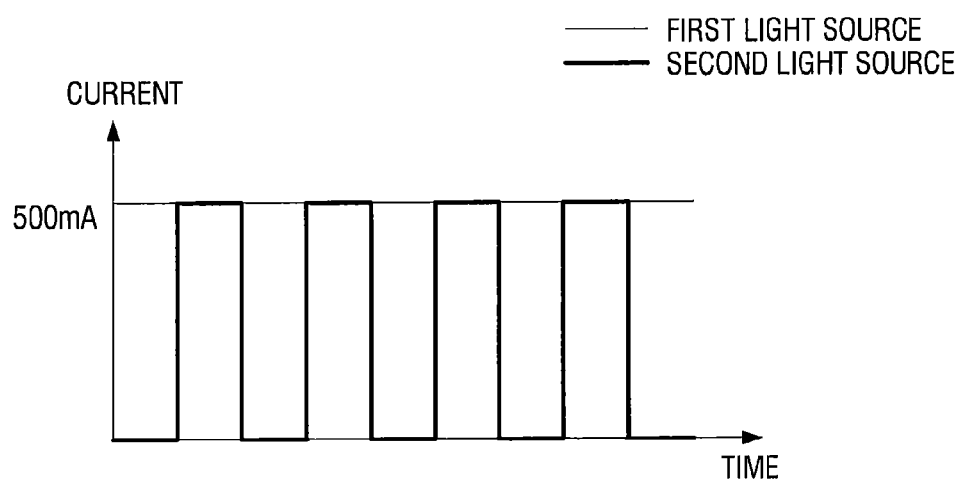
FIG. 4 illustrates a control method of light sources, according to an exemplary embodiment.

FIG. 1 is a schematic diagram illustrating an image scanning apparatus according to an exemplary embodiment, FIG. 2 illustrates an example of the structure of the image scanning apparatus illustrated in FIG. 1, according to an exemplary embodiment, FIG. 3 illustrates an example of the relationship between the turn-on duty of a light-emitting diode (LED) and the temperature of heat generated by the LED, and FIG. 4 illustrates a control method of light sources, according to an exemplary embodiment.

Referring to FIG. 1, an image scanning apparatus 1 includes a document table 20 on which a document 10 is placed and a frame 30 that is arranged so as to be reciprocally movable in directions indicated by a bidirectional arrow.

The document table 20 may be formed of a transparent material such that it can transmit light emitted from a light source unit 110, as illustrated in FIG. 2, therethrough.

FIG. 2 illustrates a light guide unit 120 and a sensor unit 150 may be installed in a frame, e.g., frame 30. The light guide unit 120 may evenly diffuse light emitted from the light source unit 110 toward the document 10. The sensor unit 150 may sense image data from the document 10 by recognizing light that is reflected from the document 10 via diffusion.

FIG. 2 illustrates a light source unit 110 including a first light source 112 and a second light source 114. The first light source 112 and the second light source 114 may be implemented as LEDs.

The light source unit 110 may be connected to and controlled by a control unit 170.

The light guide unit 120 includes a first light guide 122 and a second light guide 124. The first light source 112 may be installed at an end of the first light guide 122, and the second light source 114 may be installed at an end of the second light guide 124. The first light guide 122 and the second light guide 124 may be a predetermined distance apart from each other, and may be arranged in parallel with each other.

As illustrated in FIG. 1, a heat dissipation plate 190 may be installed in the frame 30, facing a light source unit, e.g., the light source unit 110.

The heat dissipation plate 190 may reduce heat emitted from the light source unit 110. If the temperature of the light source unit 110 can be reduced, a large-size heat dissipation plate 190 may be no longer needed. In an exemplary embodiment, the heat dissipation plate 190 may be optional.

An exemplary operation of the image scanning apparatus 1 includes that in response to the document 10 being placed on the document table 20, light may be emitted from the light source unit 110, and the light may be evenly diffused over the document 10 by the light guide unit 120. The sensor unit 150 may sense image data from the document 10 based on light reflected from the document 10, and the image scanning apparatus 1 may convert the image data into digital data.

A relationship between the temperature of heat generated by an LED and the turn-on duty of the LED is illustrated in FIG. 3. Referring to FIG. 3, the temperature of heat generated by an LED is proportional, e.g., directly proportional to the turn-on duty of the LED. The performance and the properties of an LED (for example, brightness, color gamut, and lifetime) depend on the temperature of heat generated by the LED. A continuous use of a high-performance LED may inevitably lead to an increase in the temperature. Assuming that a 350 mA LED reaches a temperature of 100° C. after a continuous turning on of the LED, the temperature of the LED may be reduced to 50° C. by setting the turn-on duty of the LED to 50%. When an LED is turned on or off at intervals of 10 microseconds, i.e., when the LED is turned on for five microseconds and then turned off for five microseconds repeatedly, the temperature of the LED may decrease in inverse proportion to the turn-on duty of the LED. The temperature of the LED may also be reduced by reducing a current. In this example, however, the performance of the LED may deteriorate. To address this problem, a plurality of low-performance LEDs may be used, which, however, may result in an uneven emission of light and an increase in the manufacturing cost.

An exemplary control method of a light source unit, e.g., light source unit 110 of the image scanning apparatus 1 is described.

In a case in which the light source unit 110 needs to be turned on for performing image scanning on the document 10, the control unit 170 may alternately turn on the first light source 112 and the second light source 114 such that a turn-on period of the first light source 112 and a turn-on period of the second light source 114 do not overlap with each other. For example, if the first light source 112 and the second light source 114 both have a current of 500 mA, the control unit 170 may drive the first light source 112 and the second light source 114 with a current of 500 mA. Since the current of the light source unit 110 is inversely proportional to the temperature of heat generated by the light source unit 110, the control unit 170 may alternately turn on the first light source 112 and the second light source 114 over the course of image scanning, to reduce the temperature of heat generated by the light source unit 110. For example, referring to FIG. 4, the control unit 170 may control the second light source 114 to be turned off while the first light source 112 is turned on, and may control the first light source 112 to be turned off while the second light source 114 is turned on. For example, the first light source 112 and the second light source 114 may be turned on or off alternately, and the turn-on duty cycle of the first light source 112 and the second light source 114 may be set to 50%. If the turn-on duty cycle of the first light source 112 and the second light source 114 are both below 50%, i.e., if the first light source 112 and the second light source 114 are turned off for more than 50% of a total light source turn-on period for performing image scanning, the light source unit 110 may undesirably appear to flicker.

For example, the first light source 112 and the second light source 114 may be implemented as LEDs. Alternatively, cold cathode fluorescent lamps (CCFLs) or xenon (Xe) lamps may be used as the first light source 112 and the second light source 114. In the latter example, however, the first light source 112 and the second light source 114 may respond very slowly. Therefore, the first light source 112 and the second light source 114 may be implemented as LEDs, and particularly, high-performance LEDs.

The control unit 170 may control the first light source 112 and the second light source 114 such that a uniform amount of light can be incident upon the sensor unit 150. When an irregularity in the amount of light incident upon the sensor unit 150 is greater than 20%, the quality of an image may deteriorate. Accordingly, the control unit 170 may control the light source unit 110 such that any irregularity in the amount of light incident upon the sensor unit 150 is less than 20%.

Due to an improper turning or off of the first light source 112 and the second light source 114, a period during which no light is incident upon the sensor unit 150 may be encountered. In this example, the amount of light incident upon the sensor unit 150 may decrease. Alternatively, in a case in which the first light source 112 and the second light source 114 are turned on or off at a low frequency, the sensor unit 150 may determine the light source unit 110 as flickering, which adversely affects the quality of an image. To prevent the light source unit 110 from flickering, the control unit 170 may control the frequency of the light source unit 110. The higher the frequency of the light source unit 110, the less likely the sensor unit 150 is to perceive a flicker. Thus, the control unit 170 may control the frequency of the light source unit 110 to be maintained within the range of about 50 kHz to about 200 kHz in consideration of the sensing speed of the sensor unit 150 and the response speed of the light source unit 110.

A control method of an image scanning apparatus, according to an exemplary embodiment is described with reference to FIG. 5.

Figure 5:
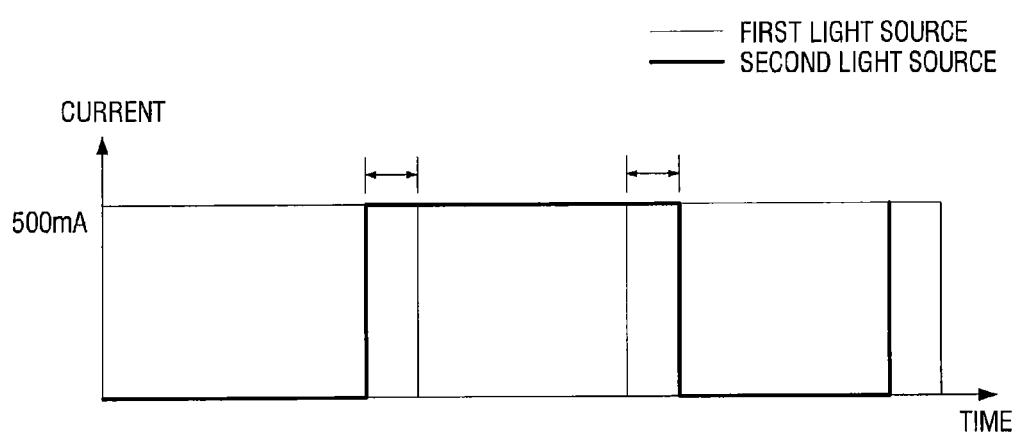
FIG. 5 illustrates a control method of light sources, according to an exemplary embodiment.

FIG. 5 illustrates a control method of an image scanning apparatus, according to an exemplary embodiment. The exemplary embodiment illustrated in FIG. 5 is similar to the exemplary embodiment illustrated in FIG. 4, and thus, is described, focusing mainly on differences with the exemplary embodiment illustrated in FIG. 4.

Referring to FIG. 5, the control unit 170 may control the turning on of the first light source 112 and the second light source 114 such that a turn-on period of the first light source 112 and a turn-on period of the second light source 114 can partially overlap with each other, as indicated by bidirectional arrows. In this example, the overlap period between the turn-on period of the first light source 112 and the turn-on period of the second light source 114 may be appropriately set between 0% and 100% in accordance with a target temperature.

In the exemplary embodiment illustrated in FIG. 5, the control unit 170 may control the turn-on duty cycle of the first light source 112 and the second light source 114 to be within the range of 50% to 100%.

According to the exemplary embodiment illustrated in FIG. 5, it is possible to appropriately set the turn-on duty of a light source within a given range and thus to reduce the temperature of the light source. For example, if the turn-on duty cycle of the first light source 112 and the second light source 114 are both set to 80%, the temperature of the light source unit 110 may be reduced by 20%. Alternatively, if the turn-on duty cycle of the first light source 112 and the second light source 114 are both set to 60%, the temperature of the light source unit 110 may be reduced by 40%. Therefore, according to the exemplary embodiment illustrated in FIG. 5, it is possible to appropriately control the amount by which the temperature of the light source unit 110 should be reduced in consideration of the capability of the heat dissipation plate 190. In addition, by appropriately adjusting the turn-on duty cycle of the first light source 112 and the second light source 114 with the aid of the control unit 170, it is possible to make the heat dissipation plate 190 optional or reduce the size of the heat dissipation plate 190.

In the exemplary embodiment illustrated in FIG. 5, as in the exemplary embodiment illustrated in FIG. 4, the control unit 170 may control the frequency of the light source unit 110 to be maintained within the range of about 50 kHz to about 200 kHz to prevent the light source unit 110 from flickering.

An image scanning apparatus according to an exemplary embodiment is described with reference to FIG. 6.

Figure 6:
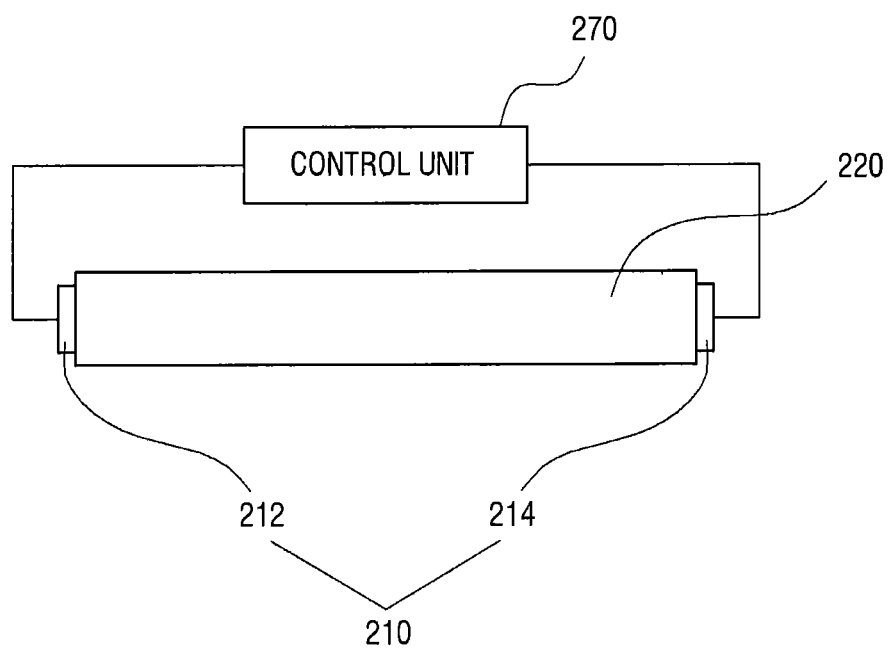
FIG. 6 illustrates an image scanning apparatus according to an exemplary embodiment.

FIG. 6 illustrates an image scanning apparatus according to an exemplary embodiment. The configuration of the image scanning apparatus illustrated in FIG. 6 is similar to the configuration of the image scanning apparatus 1 illustrated in FIG. 1, and thus, the image scanning apparatus illustrated in FIG. 6 is described, focusing mainly on the differences with the image scanning apparatus 1 illustrated in FIG. 1.

Referring to FIG. 6, the image scanning apparatus includes a light source unit 210, a light guide unit 220, and a control unit 270.

The light source unit 210 includes a first light source 212 and a second light source 214. The first light source 212 and the second light source 214 may be installed at either end of the light guide unit 220.

The first light source 212 and the second light source 214 may be connected to the control unit 270.

The control unit 270 may alternately turn on the first light source 212 and the second light source 214 such that a turn-on period of the first light source 212 and a turn-on period of the second light source 214 do not overlap with each other, as described above with reference to FIG. 4, or may alternately turn on the first light source 212 and the second light source 214 such that the turn-on period of the first light source 212 and the turn-on period of the second light source 214 partially overlap with each other, as described above with reference to FIG. 5.

To prevent the light source unit 210 from flickering, the control unit 270 may control the frequency of the light source unit 210 to be maintained within the range of about 50 kHz to about 200 kHz.

Since the light guide unit 220 includes only one light guide, it is possible to reduce the size of the light guide unit 220 and the manufacturing cost of an image scanning apparatus.

An image scanning apparatus according to an exemplary embodiment is described with reference to FIG. 7.

Figure 7:
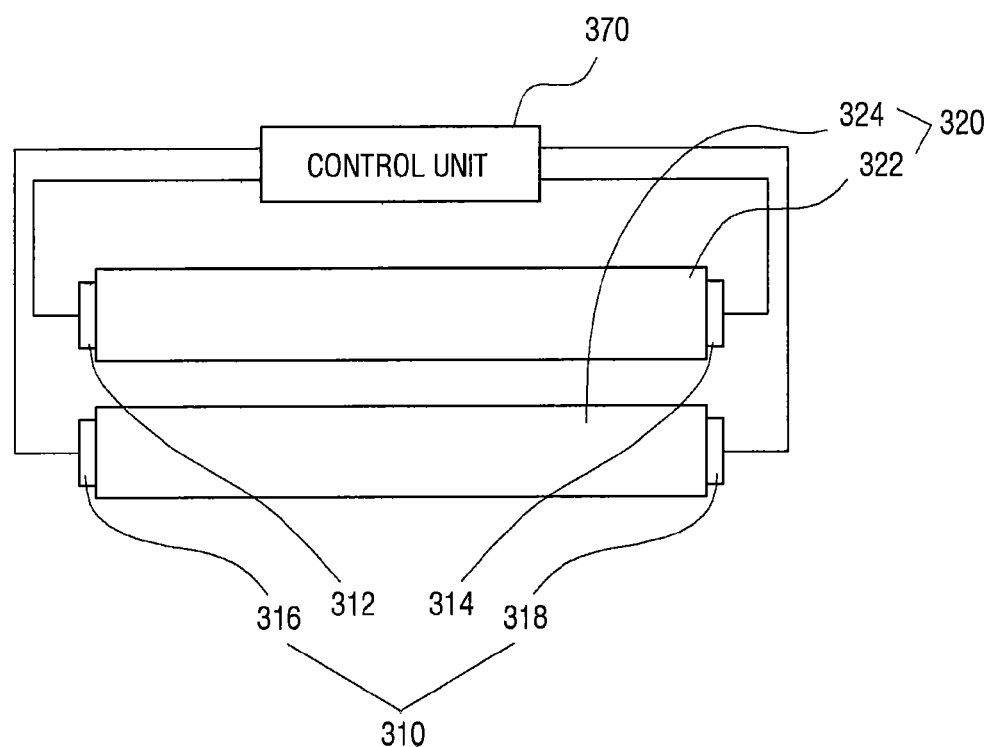
FIG. 7 illustrates an image scanning apparatus according to an exemplary embodiment.

FIG. 7 illustrates an image scanning apparatus according to another exemplary embodiment. The configuration of the image scanning apparatus illustrated in FIG. 7 is similar to the configuration of the image scanning apparatus 1 illustrated in FIG. 1, and thus, the image scanning apparatus illustrated in FIG. 7 is described, focusing mainly on the differences with the image scanning apparatus 1 illustrated in FIG. 1.

Referring to FIG. 7, the image scanning apparatus includes a light source unit 310, a light guide unit 320, and a control unit 370. The light source unit 310 includes a first light source 312, a second light source 314, a third light source 316, and a fourth light source 318.

The first light source 312, the second light source 314, the third light source 316, and the fourth light source 318 may all be connected to the control unit 370.

The light guide unit 320 includes a first light guide 322 and a second light guide 324.

The first light source 312 and the second light source 314 may be installed at either end of the first light guide 322.

The third light source 316 and the fourth light source 318 may be installed at either end of the second light guide 324.

For example, the control unit 370 may turn off the second light source 314 and the fourth light source 318 when turning on the first light source 312 and the third light source 316, and may turn on the second light source 314 and the fourth light source 318 when turning off the first light source 312 and the third light source 316. Alternatively, the control unit 370 may turn off the second light source 314 and the third light source 316 when turning on the first light source 312 and the fourth light source 318, and may turn on the second light source 314 and the third light source 316 when turning off the first light source 312 and the fourth light source 318. That is, the control unit 370 may control the turning on or off of the light source unit 310 such that the light sources installed at one end of the light guide unit 320 are turned off when the light sources installed at the other end of the light guide unit 320 are turned on.

The control unit 370 may control the turning on or off of the light source unit 310 such that turn-on periods of the first light source 312, the second light source 314, the third light source 316, and the fourth light source 318 partially overlap with one another.

To prevent the light source unit 310 from flickering, the control unit 370 may control the frequency of the light source unit 310 to be maintained within the range of about 50 kHz to about 200 kHz.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image scanning apparatus which scans an image of a document and converts the scanned image into digital data, the image scanning apparatus comprising:
   a plurality of light sources that emit light;
   a light guide unit that diffuses the light emitted by the light sources, wherein the light guide unit comprises a first light guide and a second light guide that is oriented parallel to the first light guide to evenly diffuse light over the document during a scanning;
   a sensor unit that senses image data from the document by recognizing light reflected from the document by being diffused by the light guide unit;
   a control unit that controls the turning on of the light sources, wherein the control unit alternately turns on or off the light sources such that at least one light source of the plurality of light sources is turned on when at least one other light source of the plurality of light sources is turned off to reduce a temperature of heat generated by each of the plurality of light sources; and
   a heat dissipation plate facing the plurality of light sources and having a size based on a turn-on duty cycle of the light sources.

2. The image scanning apparatus of claim 1, wherein the control unit controls the turn-on duty cycle of each of the light sources to be at least 50% or higher.

3. The image scanning apparatus of claim 2, wherein the control unit controls a frequency of each of the light sources to be within a range of about 50 kHz to about 200 kHz to prevent flickering of the light emitted from the light guide unit.

4. The image scanning apparatus of claim 1, wherein the light sources comprise at least one light source installed at one end of the first light guide and at least one light source installed at one end of the second light guide.

5. The image scanning apparatus of claim 1, wherein the light sources comprise a first light source and a second light source.

6. The image scanning apparatus of claim 5, wherein the first light source is installed at one end of the first light guide and the second light source is installed at one end of the second light guide.

7. The image scanning apparatus of claim 6, wherein the control unit controls the first light source and the second light source to be alternately turned on.

8. An image scanning apparatus which scans an image of a document and converts the scanned image into digital data, the image scanning apparatus comprising:
   a plurality of light sources that emit light;
   a light guide unit that diffuses the light emitted by the light sources, wherein the light guide unit comprises a first light guide and a second light guide that is oriented parallel to the first light guide;
   a sensor unit that senses image data from the document by recognizing light reflected from the document by being diffused by the light guide unit; and
   a control unit that controls the turning on of the light sources, wherein the control unit alternately turns on or off the light sources such that at least one light source of the plurality of light sources is turned on when at least one other light source of the plurality of light sources is turned off,
   wherein the light sources comprise a first light source and a second light source, and
   wherein the first light source is installed at one end of the first light guide and the second light source is installed at one end of the second light guide, wherein the control unit controls the first light source and the second light source such that a turn-on period of the first light source and a turn-on period of the second light source partially overlap with each other.

9. The image scanning apparatus of claim 1, wherein the light sources are light-emitting diodes (LEDs).

10. A control method of an image scanning apparatus which scans an image of a document and converts the scanned image into digital data, the control method comprising:
    emitting light by turning on a plurality of light sources, wherein the emitted light is diffused by a first light guide and a second light guide that is oriented parallel to the first light guide to evenly diffuse light over the document during a scanning;
    sensing image data from the document by recognizing light reflected from the document by being diffused; and
    converting the image data into digital data, wherein the turning on the light sources comprises alternately turning on or off the light sources such that at least one of the light sources of the plurality of light sources is turned on when at least one other light source of the plurality of light sources is turned off to reduce a temperature of heat generated by each of the plurality of light sources;
    wherein the turning on the light sources further comprises controlling a turn-on duty cycle of each of the light sources to reduce a size of a heat dissipation plate required by the image scanning apparatus.

11. The control method of claim 10, wherein the turning on the light sources further comprises controlling a turn-on duty of each of the light sources to be at least 50% or higher.

12. The control method of claim 10, wherein the turning on the light sources further comprises controlling a frequency of each of the light sources to be within a range of about 50 kHz to about 200 kHz to prevent flickering of the light emitted from the light guide unit.

13. The control method of claim 10, wherein the turning on the light sources further comprises controlling the light sources such that turn-on periods of the light sources do not overlap with each another.

14. A control method of an image scanning apparatus which scans an image of a document and converts the scanned image into digital data, the control method comprising:
    emitting light by turning on a plurality of light sources, wherein the emitted light is diffused by a first light guide and a second light guide that is oriented parallel to the first light guide;
    sensing image data from the document by recognizing light reflected from the document by being diffused;
    and converting the image data into digital data, wherein the turning on the light sources comprises alternately turning on or off the light sources such that at least one of the light sources of the plurality of light sources is turned on when at least one other light source of the plurality off light sources is turned off,
    wherein the turning on the light sources further comprises controlling the light sources such that turn-on periods of the light sources partially overlap with each another.

15. The control method of claim 10, wherein the light sources are LEDs.

16. A control method of an image scanning apparatus, the control method comprising:
    increasing an intensity of a first source of light, which is diffused by a first light guide, while decreasing an intensity of a second source of light, which is diffused by a second light guide that is oriented parallel to the first light guide to reduce a temperature of heat generated by each of the first source of light and the second source of light;
    controlling a turn-on duty cycle of the first source of light and the second source of light to reduce a size of a heat dissipation plate required by the image scanning apparatus;
    sensing image data from a document by recognizing light reflected from the document by being diffused; and converting the image data into digital data,
    wherein the first light guide and the second light guide are movable in a plane parallel to a plane of the image to be scanned to evenly diffuse light over the document during a scanning.

17. An image scanning apparatus comprising:
    a light guide unit that diffuses the light emitted by a plurality of light sources, wherein the light guide unit comprises a first light guide and a second light guide that is oriented parallel to the first light guide; and
    a control unit that controls the turning on of the light sources, wherein the control unit alternately turns on or off the light sources such that at least one light source of the plurality of light sources is turned on when at least one other light source of the plurality of light sources is turned off to reduce a temperature of heat generated by the light sources,
    wherein the light guide unit including the first light guide and the second light guide is movable in a plane parallel to a plane of an image to be scanned to evenly diffuse light over the document during a scanning,
    wherein the turning on the light sources further comprises controlling a turn-on duty cycle of each of the light sources to reduce a size of a heat dissipation plate required by the image scanning apparatus.

18. The image scanning apparatus of claim 1, wherein the light guide unit including the first light guide and the second light guide is movable in a plane parallel to a plane of the image to be scanned.

19. The control method of claim 10, wherein the first light guide and the second light guide are movable in a plane parallel to a plane of the image to be scanned.

* * * * *

UNITED STATES PATENT AND TRADEMARK OFFICE
CERTIFICATE OF CORRECTION

| | | |
|---|---|---|
| PATENT NO. | : 9,001,394 B2 | Page 1 of 1 |
| APPLICATION NO. | : 13/453633 | |
| DATED | : April 7, 2015 | |
| INVENTOR(S) | : Seung-je Joh et al. | |

It is certified that error appears in the above-identified patent and that said Letters Patent is hereby corrected as shown below:

In the Claims

Claim 14, Column 9, Line 22:

delete "off" and insert --of--, therefor.

Signed and Sealed this
Eighteenth Day of August, 2015

Michelle K. Lee
*Director of the United States Patent and Trademark Office*